Jan. 3, 1961     A. J. GEEN     2,967,050
HUMIDIFIER
Filed May 1, 1957     3 Sheets-Sheet 1
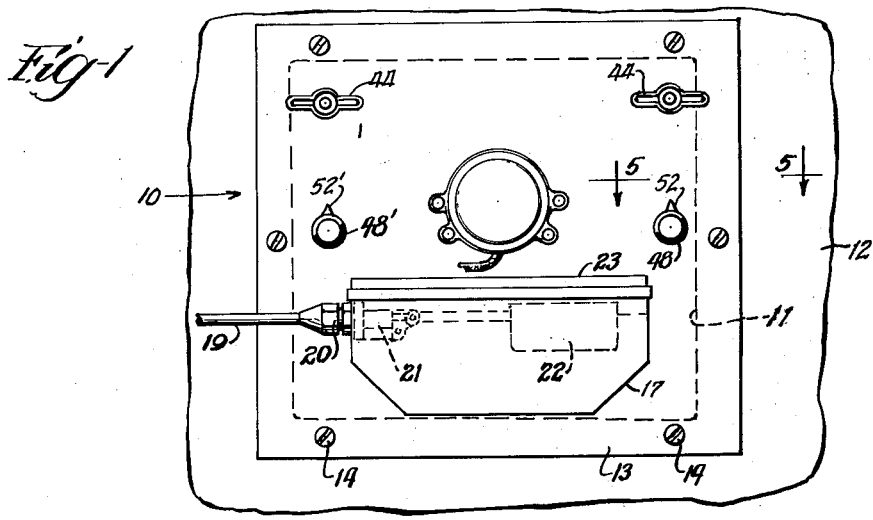
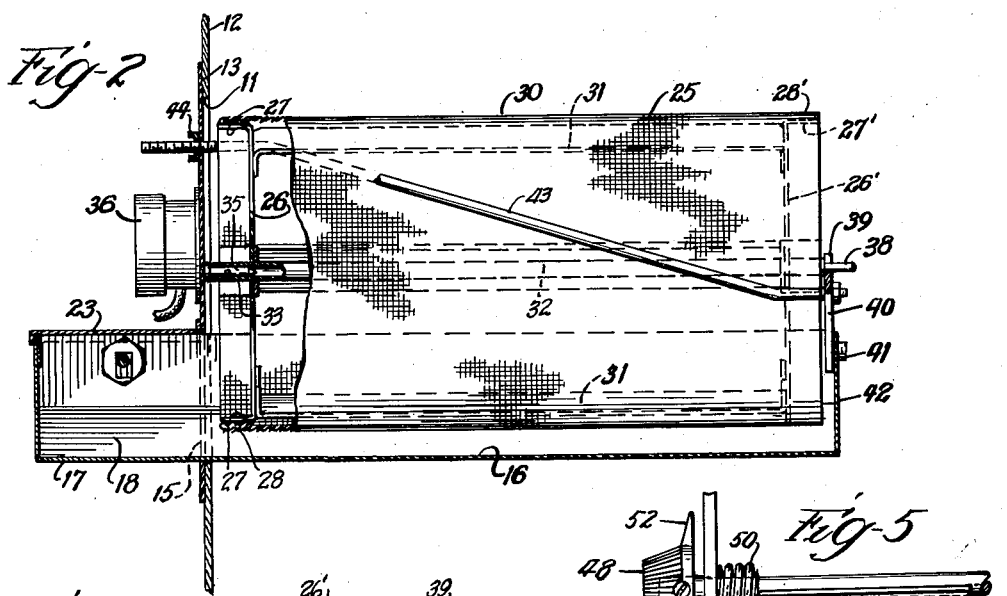
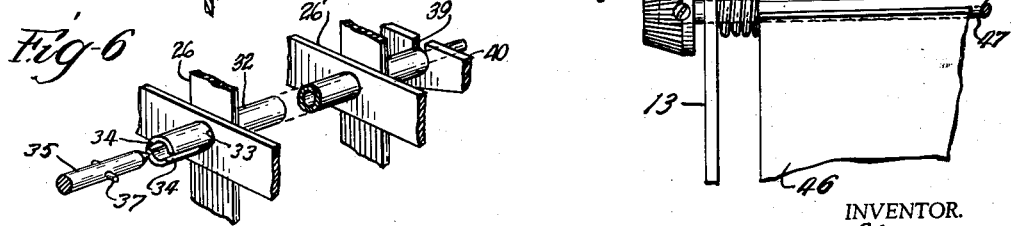
INVENTOR.
Arthur J. Geen
BY
Cromwell, Greist & Warden Jan. 3, 1961 A. J. GEEN 2,967,050
HUMIDIFIER
Filed May 1, 1957 3 Sheets-Sheet 2
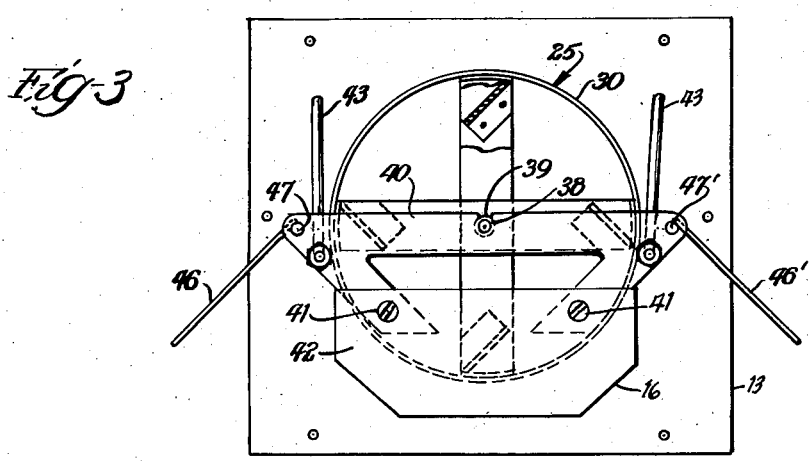
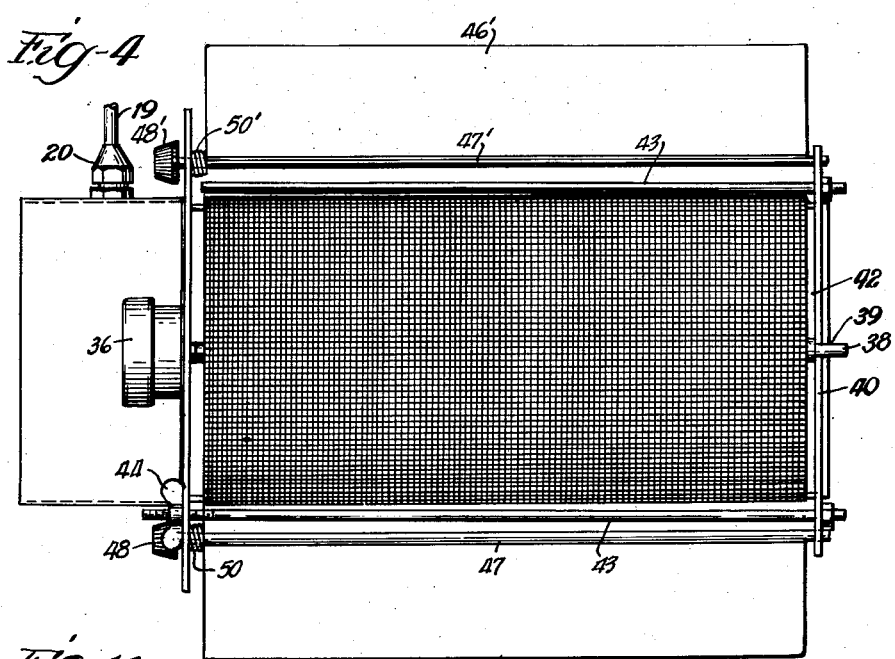
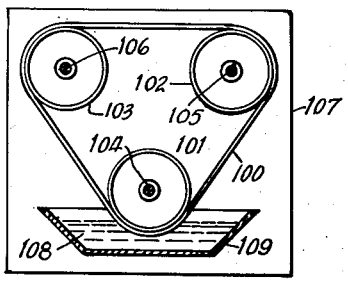
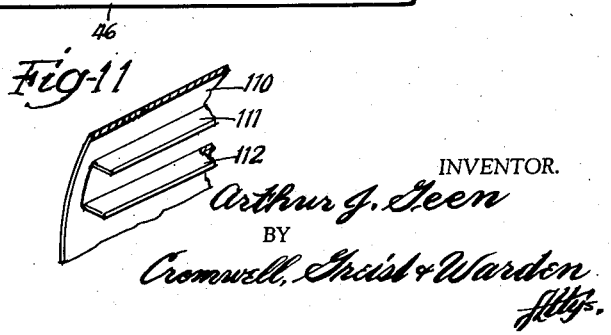
INVENTOR.
Arthur J. Geen
BY
Cromwell, Greist & Warden
Attys.

Jan. 3, 1961
A. J. GEEN
2,967,050
HUMIDIFIER
Filed May 1, 1957
3 Sheets-Sheet 3
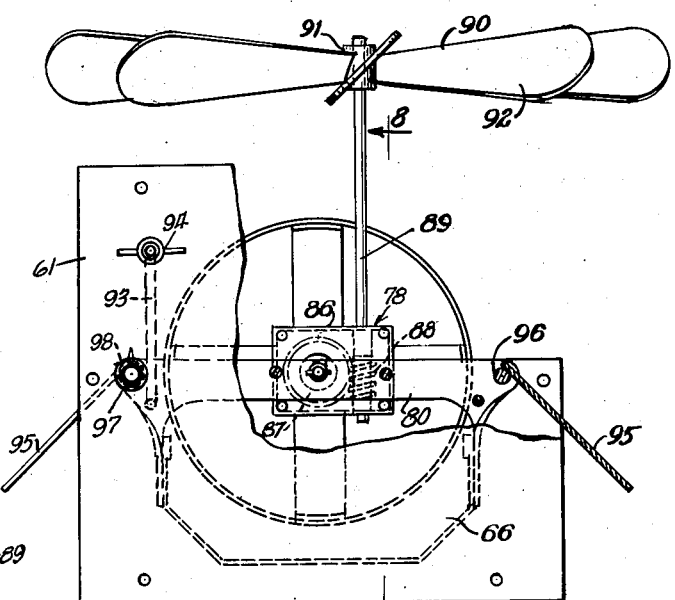
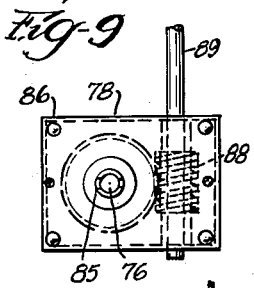
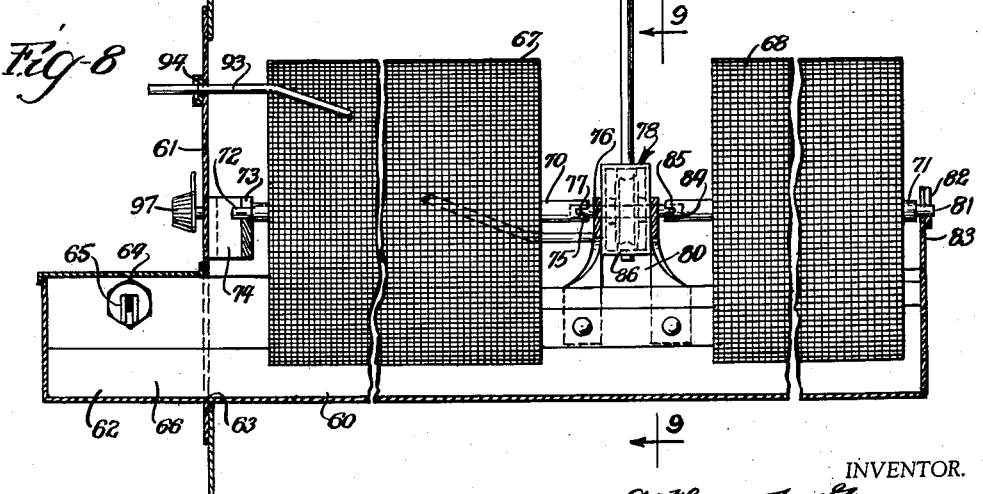
INVENTOR.
Arthur J. Geen
BY
Cromwell, Greist & Warden
Attys.

United States Patent Office 2,967,050
Patented Jan. 3, 1961

2,967,050
HUMIDIFIER

Arthur J. Geen, Elmhurst, Ill., assignor to Drain Enterprises, Inc., Addison, Ill., a corporation of Illinois Filed May 1, 1957, Ser. No. 656,439

3 Claims. (Cl. 261—92)

This invention relates to air heating and conditioning systems and is more particularly concerned with improvements in a humidifier adapted for installation in the furnace of a warm air heating system.

It is a general object of the invention to provide a humidifier for use with a warm air furnace which can be readily installed in the furnace and which, after initial installation and adjustment, will operate automatically to supply moisture to the heated air when the furnace operates to supply the heat required.

It is a more specific object of the invention to provide an apparatus for adding moisture to the warm air delivered by a furnace, which comprises a water trough adapted to be mounted in the moving current of air heated by the furnace, a water feed line connected to a water supply and having automatically controlled means for delivering water through the feed line to the trough and for maintaining the level thereof in the trough constant, and a rotatable cylinder mounted so that it dips into the water in the trough, which cylinder is adapted to be driven while the furnace is in operation so as to present to the heated air a substantial wetted area for evaporation therefrom of water carried up from the supply in the trough.

It is a still more specific object of the invention to provide a humidifier for incorporation in a circulating air furnace which comprises a water trough supported within the path of the air circulated by the furnace, the trough being connected to a water supply and having a device for maintaining a constant level of water in the trough, a drum-like cylinder mounted on a horizontal axis and having a portion of its periphery dipping into the water in the trough, the cylinder having a perforated or foraminate surface which holds the water on the surface and insures that substantial wetted areas are exposed to the path of the heated air, and a drive means for slowly rotating the cylinder while the furnace is operating to heat and/or circulate the air.

It is a still further object of the invention to provide a humidifier for use with a warm air furnace which comprises a water trough adapted to be mounted in the furnace, a line connecting the trough to a water supply and having associated therewith mechanism for supplying water to the trough at a constant level, and an electric motor connected to the cylinder for rotating the same which is operative simultaneously with the operation of the heater.

It is another object of the invention to provide a humidifier for use with a warm air furnace which comprises a water trough supported within the path of the air delivered by the furnace, the trough being connected to a water supply and having a device for maintaining a constant level of water in the trough, a rotatable drum having a screen surface and mounted on a horizontal axis above the trough so that a portion of the screen dips into the water in the trough, and a drive mechanism for the drum which includes an air fan arranged for operation by movement of the air in the furnace.

It is a still further object of the invention to provide a humidifier for use with a warm air furnace which comprises a screen-like drum rotatably supported above a water trough and dipping therein, a mechanism for rotating the drum when the furnace is in operation, and baffle members adjustably mounted adjacent the sides of the drum to control the amount of air which is circulated over the drum.

These and other objects and advantages of the invention will be apparent from a consideration of the humidifier constructions which are shown by way of illustration in the accompanying drawings wherein:

Figure 1 is an end elevation of a humidifier embodying the principal features of the invention, the device being shown as it appears when mounted in the bonnet of a circulating hot air furnace;

Figure 2 is a side elevation of the humidifier with portions thereof broken away;

Figure 3 is an end elevation of the inner end of the humidifier;

Figure 4 is a plan view of the humidifier;

Figure 5 is a fragmentary section taken on line 5—5 of Figure 1 to an enlarged scale;

Figure 6 is a detail perspective view, to an enlarged scale, of part of the mounting for the screen drum;

Figure 7 is a front elevation of a modified form of the apparatus;

Figure 8 is a cross section of the apparatus shown in Figure 7, taken on line 8—8 of Figure 7;

Figure 9 is a cross section taken on line 9—9 of Figure 8;

Figure 10 is a cross sectional view illustrating a further modification of the apparatus; and Figure 11 is a fragmentary perspective view illustrating another modification of the apparatus.

Referring to Figures 1 to 6 of the drawings there is illustrated a humidifier apparatus 10 which incorporates the principles of the invention and which is shown as it appears when it is installed in the bonnet of a warm air furnace, the apparatus being located at a point above the burner (not shown) so that it is in the upwardly rising stream or current of heated air which results from the operation of the burner.

The humidifier apparatus 10 is preferably supported in an aperture 11 in an upright wall 12 of the bonnet portion of the furnace by means of an end mounting plate 13 which is somewhat larger than the aperture 11 and which is adapted to be secured in vertical position on the furnace wall 12 by screws 14 or other separable or removable fastening elements so that the apparatus is readily removable for cleaning and repair when required. The end mounting plate 13 is apertured at 15 to accommodate a horizontally extending pan or water trough 16. The water pan 16, which is of generally rectangular cross section, extends a substantial distance into the furnace and has the one end 17 projecting outwardly of the mounting plate 13. The water pan 16 is supplied with water, indicated at 18, from a supply line 19 which is connected at 20 with a valve 21 positioned within the end 17 of the pan 16 and controlled by a pivoted float member 22. The open top of the exterior section 17 of the pan 16 is provided with a suitable cover 23.

A water carrying drum or cylinder 25 is mounted above the pan 16 on the inside of the end supporting plate 13. The drum 25 comprises end frames 26 and 26' which may be conveniently formed of crossed strap or strip plate members having bent end flanges 27 and 27' to which are secured marginal edge portion 28 and 28' of the cylindrical screen member 30 which forms the wall of the drum 25. The end frames 26 and 26' may be connected by strap-like brace members 31 peripherally spaced about the drum 25. The screen member 30 may be formed of a variety of materials but phosphorous bronze wire screen of the type generally employed for insect screens is preferred. Other materials which may be used are copper, lead, nylon or fabric materials or combinations of the same and more than one layer of the screen material may be employed. The drum 25 is supported on a shaft 32 which has a hollow end forming a sleeve 33 with a radial slot 34 to connect the same in driving relation with the end of the drive shaft 35 of a motor 36, the drive shaft having a cross pin 37 for engaging in the end slot 34 of the shaft 32 to provide a telescoping disconnectible drive between the operating motor 36 and the drum supporting shaft 32. The motor 36 may be secured on the end plate 13 in any convenient manner. At the other end of the cylinder the shaft 32 has an end portion 38 of reduced cross section which is received in the upwardly opening bearing slot 39 formed in a bracket 40 which is secured by fastening members 41 to the end wall 42 of the pan 16. Brace rods 43 are provided which extend from the bracket 40 to the end mounting plate 13 and which have threaded ends thereon for receiving thumb nuts 44 to permit leveling of the pan 16 and the structure supported by the same.

A pair of baffle plates 46 and 46' are provided at opposite sides of the drum 25 which are mounted on rods 47 and 47'. The rods 47 and 47' are journaled in the supporting bracket 40 at one end of the pan 16 and in the end plate 13 at the other end thereof. Control knobs 48 and 48' are provided on the ends of rods 47 and 47' outside of the supporting plate 13, and compression springs 50 and 50' extend between the baffle plates 46 and 46' and the end plate 13 to frictionally hold the baffle plates 46 and 46' in any position in which they are set by the rotation of the knobs 48 and 48', the latter having pointers 52 and 52' which indicate the position of the baffle plates 46 and 46'.

In operation the humidifier 10 is installed in the bonnet of the furnace with the supporting end plate 13 secured to the vertical wall 12. The water valve 21 is properly adjusted so that the float 22 will maintain the water supply 18 in the pan 16 at a constant level. The motor 36, which is the same general type as used with an electric clock, may be connected to an electric line so that it is constantly rotated if desired, the motor having a speed reducer associated with it so that the speed of rotation is relatively low and the rotation of the drum 25 is comparatively slow. Alternatively, the motor 36 may be connected into the electrical control circuit for the furnace so that the motor will operate only when the burner is in operation or when the blower fan is running. When the motor 36 is connected into the burner or fan control circuit the drum 25 will rotate only during the operation of the burner or the circulation of the hot air, the circuits being usually controlled by a thermostat placed in the area to which the heated air is conducted. The baffle plates 46 and 46' may be manually adjusted to increase or decrease the flow of air around the drum 25 as desired. The drum 25 may be readily removed by merely lifting the inner end of the shaft 32 sufficiently to clear the bearing slot 39 and then shifting the drum 25 in the direction of its axis of rotation to disconnect the other end of the shaft 32 from the motor shaft 35.

Referring to Figures 7 to 9 of the drawings, there is illustrated a modified form of the humidifier. In this form of the apparatus, a water supply pan 60 is supported on an end mounting panel 61 with an end section 62 of the pan 60 projecting through an aperture 63 in the panel 61 and having a cover 64. A water supply line 65 is connected to the pan with provision for maintaining a constant level of water 66 in the pan 60 as in the form of the apparatus previously described. The water pan 60 extends into the furnace and a pair of axially aligned drum members 67 and 68 are mounted for rotation above the pan 60. The drums 67 and 68 are preferably constructed in the same manner as the drum 25 in the form of the apparatus shown in Figures 1 to 6. They are mounted on supporting shafts 70 and 71 with the front drum 67 having the front end of its shaft 70 provided with a bearing section 72 which is reduced in cross section and which is journaled in an upwardly opening bearing socket 73 in a bearing bracket 74 attached to the end mounting plate 61. The shaft 70 has a hollow end at the other end of the drum 67 which is slotted at 75 for telescoping connection with the end of the drive shaft 76, the latter having a cross pin 77 engaging in the slot 75. The shaft 76 forms part of a drive mechanism indicated at 78 (Figures 8 and 9) supported on a cross frame member 80 which bridges the top of the pan 60. The shaft 71 of the drum 68 has a bearing section 81 at its rear end which is reduced in cross section and removably mounted in the upwardly opening bearing socket 82 on the cross wall 83 at the inner end of the water pan 60. The other end of the shaft 71 is hollow and slotted at 84 for telescoping connection with the drive shaft 76, the latter having a cross pin 85 engaging in the slot 84.

The drive shaft 76 is mounted in a gear box 86 supported on the cross frame member 80 and carries a pinion 87 which is in engagement with a worm 88 on a vertical shaft 89. The shaft 89 is journaled in the gear box 86 and carries at its upper end an air fan 90 having a hub portion 91 secured on the vertical shaft 89 and a series of radially extending blades 92.

Brace rods 93 are provided for connecting between the rear wall 83 of the pan 60 and the front end mounting plate 61 which are provided with adjustable nuts 94 on the threaded ends thereof to permit leveling of the pan 60.

This form of the apparatus may be provided with a pair of baffle plates 95 mounted on rods 96 which are journaled in the front end mounting plate 61 and the rear end plate 83, and which have operating knobs 97 on their front ends and friction springs 98 for holding the plates in adjusted position.

The modified form of the apparatus is driven by the movement of the air currents within the heating system. When it is installed in the bonnet of a forced air furnace the upward movement of the air stream from the burner will cause the fan 90 to rotate which drives the drums 67 and 68 and causes them to carry the water up over their surfaces and expose the same to the air currents for evaporation into the system. The drums 67 and 68 may be formed with a peripheral surface of the same material as described in connection with the form of the apparatus shown in Figures 1 to 6.

A further modification of the apparatus is shown in Figure 10 in which a water-bearing screen in the form of an endless belt 100 is supported on the drum members 101, 102 and 103, with the latter having their supporting shafts 104, 105 and 106 extending from an end supporting plate 107. The lowermost drum 101 is mounted so that it dips into a liquid 108 in a pan 109 supported on the end plate 107. One of the drum shafts, preferably shaft 104, is connected to a driving motor (not shown) which is operative to drive the drum 101 and the screen member 100, the drums 102 and 103 serving as idlers for supporting the screen member. Other details of the apparatus may be the same as described in connection with the forms thereof previously described. The belt 100, of course, operates to present a relatively large wet surface area to the air currents as the belt travels on the drums 101, 102 and 103.

The screen carrying drum or the endless belt may be provided with radially extending longitudinal rib forming members to assist in lifting liquid from the supply pan and exposing the same to the warm air for evaporation as illustrated in Figure 11. In this form of the apparatus the drum 110 is punched to form relatively narrow longitudinal rib members 111 and 112 which extend inwardly from the inner surface of the drum 110, The drum material may, of course, be wire screen or any of the other materials referred to and the rib formations may be circumferentially spaced as desired. Similar rib members may be formed of separate strips and attached in any manner to the drum surface. When the belt 100 is provided with rib members the belt supporting drums will, of course, have peripheral apertures to accommodate the rib members.

If desired, a baffle member may be placed in the water pan to extend between the float 22 and the hot air stream and prevent the hot air from circulating over the float valve mechanism.

The humidifier will ordinarily be installed in the bonnet of a furnace but it may be installed in any part of the heating system where the heated air will pass over the liquid carrying drum or belt or it may be used in a wall unit or a portable unit such as a console heater.

While specific materials and particular details of construction have been referred to in describing the illustrated forms of the invention, it will be understood that other materials and different details of construction may be resorted to within the spirit of the invention.

I claim:

1. In a humidifying apparatus adapted to be positioned in the current of hot air delivered by a hot air furnace, an elongate water pan of generally rectangular cross section, a vertical end plate for attaching the apparatus to the furnace, said end plate having an aperture through which said pan extends in a horizontal position, said pan being arranged with portions thereof on opposite sides of said end plate, means to supply water to the portion of the pan extending on one side of said end plate, means to maintain the water at a constant level in the pan, an open ended cylinder formed of a bronze screen material rotatably mounted above the portion of the water pan which is on the other side of said plate, said cylinder being of substantial length and diameter so as to provide an exterior wall having an evaporating surface of relatively large area, said cylinder being mounted on end frames, said end frames being secured on a horizontal shaft, means to support said shaft at one end on the end wall of said pan with said cylinder extending so as to cause the exterior wall surface to pass through the water in the pan as said cylinder rotates, a slow speed motor unit mounted above said pan on the other side of said end plate, said motor unit having a drive shaft extending through said end plate, said drive shaft having a cross pin adjacent the free end thereof, and the other end of said cylinder shaft having a sleeve portion which is slotted to receive the end of said drive shaft whereby to separably connect said shafts for rotation of said cylinder at a relatively slow speed, and a pair of generally rectangular elongate baffle plates mounted at each side of the cylinder, said baffle plates each being secured along one edge to a horizontal shaft positioned in spaced relation above a side edge of the water pan, said horizontal shafts being generally parallel with the axis of rotation of the cylinder, each of said shafts being journaled at one end in said vertical end plate and carrying on the free end thereof a position indicating knob which is located on the side of the end plate opposite the cylinder whereby the baffle plates may be readily adjusted to vary the current of air passing over the surface of the cylinder.

2. In a humidifying apparatus adapted to be positioned in the current of hot air delivered by a hot air furnace, an elongate water pan of generally rectangular cross section, a vertical end plate for attaching the apparatus to the furnace, said end plate having an aperture through which said pan extends in a horizontal position with portions thereof on opposite sides of said end plate, means to supply water to the pan and means to maintain the water at a constant level in the pan, an open ended cylinder formed of a screen material of relatively fine mesh rotatably mounted above the portion of the water pan which is on the one side of said end plate, said cylinder being of substantial length and diameter so as to provide an exterior wall having an evaporating surface of relatively large area, said cylinder being mounted on end frames which are secured on a horizontal shaft, means to support said horizontal cylinder shaft at one end on the end wall of said pan with said cylinder extending so as to cause the exterior wall surface to pass through the water in the pan as said cylinder rotates, a slow speed motor unit mounted above said pan on the other side of said end plate, said motor unit having a drive shaft extending through said end plate and aligned with the other end of said horizontal cylinder shaft, a separable means connecting the end of said drive shaft in driving relation with the contiguous end of said horizontal cylinder shaft, and generally rectangular elongate baffle plates mounted at each side of the cylinder, said baffle plates each being secured to a horizontal shaft rotatably mounted in spaced relation above the side of the water pan and being generally parallel with the axis of rotation of the cylinder, each of said shafts having one end extending through said vertical end plate and carrying a position indicating member which is located on the side of the end opposite the cylinder whereby the baffle plates may be readily adjusted to vary the current of air passing over the surface of the cylinder.

3. In a humidifying apparatus adapted to be positioned in the current of hot air delivered by a hot air furnace, a water pan, a vertical support for holding said pan in a horizontal position, means to supply water to the pan and maintain the same at a constant level therein, a drum rotatably mounted on a shaft supported above the pan for movement about a horizontal axis, said drum comprising a cylindrical screen providing a perforated evaporating surface of relatively large area, said screen being mounted on open end frames, said end frames being secured adjacent the ends of said drum supporting shaft, a bearing bracket having an upwardly opening bearing member supported in upstanding relation on the water pan for rotatably receiving one of the ends of said drum supporting shaft, said drum being arranged with the lower portion extending within the water pan and below the water level therein, a relatively slow speed electric drive motor, means to secure said motor on said vertical support with the drive shaft thereof extending adjacent the other end of said drum supporting shaft and in axial alignment with said bearing member, means providing a readily separable driving connection between the adjacent ends of said drive shaft and said drum supporting shaft whereby said drive motor will rotate said drum at a relatively slow speed about its horizontal axis, and a pair of generally rectangular elongate baffle plates mounted along the sides of said cylindrical drum, said baffle plates each being secured to a horizontal shaft positioned above a side wall of the water pan and being parallel with the axis of rotation of the cylindrical drum, and each said baffle plate supporting shaft being journaled in said vertical support and having a position indicating member on the free end which is located on the side of said vertical support opposite said cylindrical drum whereby the baffle plates may be readily adjusted to vary the current of air passing over the drum surface.

References Cited in the file of this patent

UNITED STATES PATENTS

| | | |
|---|---|---|
| 1,826,508 | Decker | Oct. 6, 1931 |
| 2,155,070 | Woolley | Apr. 18, 1939 |
| 2,232,586 | Alguire | Feb. 18, 1941 |
| 2,237,690 | Robic | Apr. 8, 1941 |
| 2,584,618 | Robic | Feb. 5, 1952 |
| 2,631,023 | Bailey | Mar. 10, 1953 |
| 2,677,534 | Fischer et al. | May 4, 1954 |
| 2,729,436 | Norris | Jan. 3, 1956 |
| 2,820,448 | Hansen | Jan. 21, 1958 |

UNITED STATES PATENT OFFICE
CERTIFICATION OF CORRECTION

Patent No. 2,967,050                                        January 3, 1961

Arthur J. Geen

It is hereby certified that error appears in the above numbered patent requiring correction and that the said Letters Patent should read as corrected below.

Column 6, line 23, after "end" insert -- plate --.

Signed and sealed this 6th day of June 1961.

(SEAL)
Attest:

ERNEST W. SWIDER
Attesting Officer

DAVID L. LADD
Commissioner of Patents